United States Patent [19]

Hamilton

[11] 3,953,066
[45] Apr. 27, 1976

[54] CAMPER SHELL

[76] Inventor: Philip O. Hamilton, 1624 Rouse Ave., Modesto, Calif. 95353

[22] Filed: Nov. 25, 1974

[21] Appl. No.: 526,657

[52] U.S. Cl. .............................. 296/23 R; 16/157; 135/3 A; 296/137 B
[51] Int. Cl.² .......................................... B60P 3/34
[58] Field of Search ............... 296/10, 26, 27, 23 R, 296/23 A, 137 R, 137 B; 135/1 A, 1 R, 3 A, 4 A, 5 A; 16/157, 161; 292/303, DIG. 38, 304

[56] References Cited
UNITED STATES PATENTS

| | | | |
|---|---|---|---|
| 2,225,993 | 12/1940 | Hornberger | 296/23 R |
| 3,018,782 | 1/1962 | Hershberger | 135/1 A |
| 3,061,359 | 10/1962 | Pearlman | 296/26 |
| 3,190,689 | 6/1965 | Calthorpe | 296/23 R |
| 3,255,466 | 6/1966 | Weizer | 135/1 A |
| 3,466,076 | 9/1969 | Bisbing | 292/DIG. 38 |
| 3,713,687 | 1/1973 | Hooks et al. | 296/26 |

Primary Examiner—Robert J. Spar
Assistant Examiner—Winston H. Douglas
Attorney, Agent, or Firm—Townsend and Townsend

[57] ABSTRACT

An improved camper shell adapted to be mounted to the bed of a pickup truck or similar vehicle is disclosed. The camper shell includes a shell structure having an appearance similar to a standard camper shell when the vehicle is in motion. However, a major portion of the roof is hingeably mounted to the trailing end of the forward portion of the roof along an axis normal to the direction of travel of the vehicle. The movable portion of the roof can thus be raised at its trailing end when the vehicle is parked, and flexible sheet material encloses the space provided by the raised roof. A ceiling structure spans the side portions of the shell structure immediately beneath the movable portion of the roof in its lowered configuration. A bunk is mounted to the upper surface of the ceiling structure to provide an extra sleeping area when the movable portion of the roof is raised.

6 Claims, 6 Drawing Figures

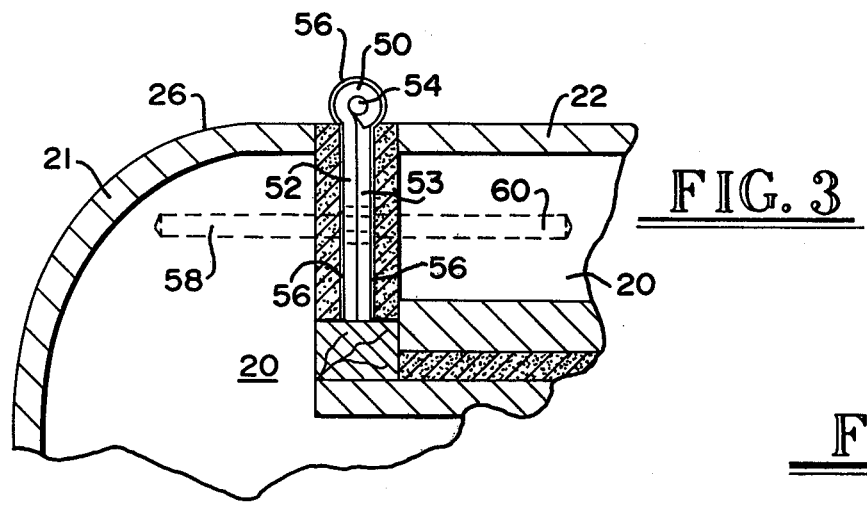
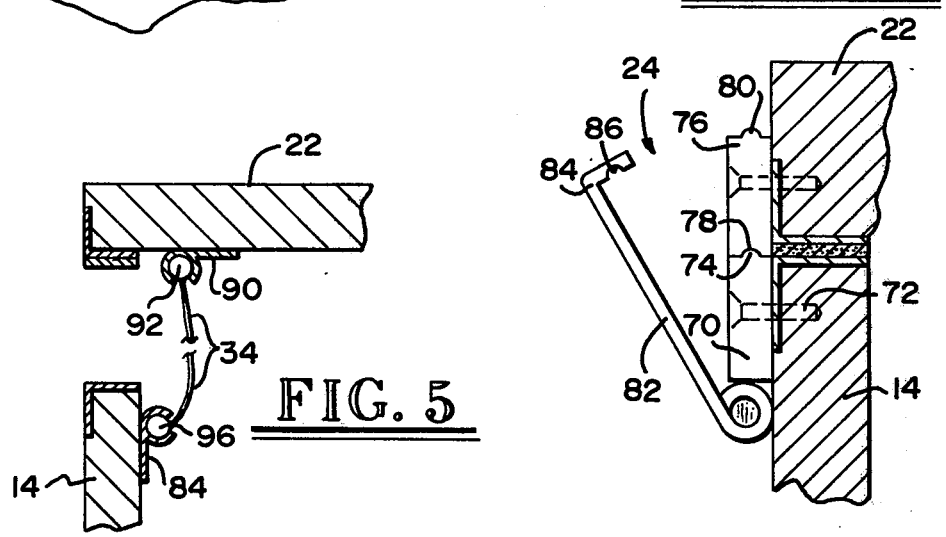
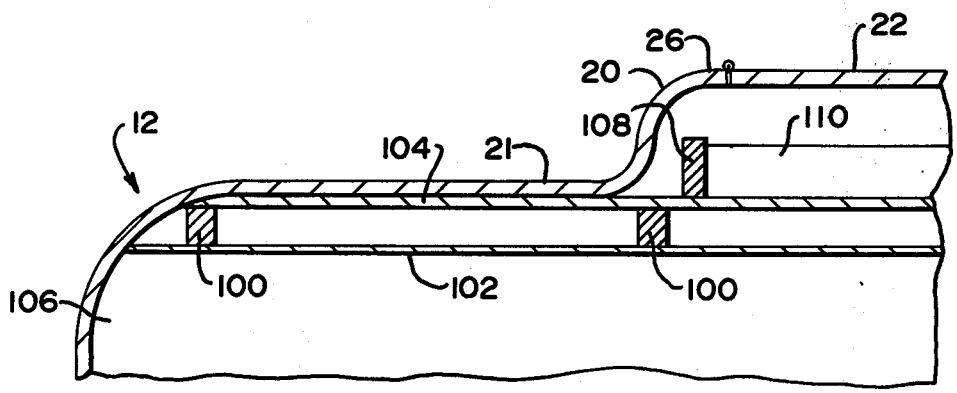

CAMPER SHELL

BACKGROUND OF THE INVENTION

The present invention relates to camper shells and in particular to a camper shell which can be expanded to provide an extra sleeping area.

A wide variety of different types of recreational vehicles have been developed in recent years. Many of these recreational vehicles are in the form of camper bodies which are mounted to the bed of a pickup truck or similar vehicle. These recreational vehicles, and particularly the camper bodies, are often quite large in order to provide sufficient room for a family to use them in comfort. However, the size of these vehicles substantially increases their gasoline consumption relative to the standard size vehicles, and the recent increases in the cost of gasoline and the decrease in its availability have rendered them to a large extent impractical. As a partial solution to this problem, camper shells have been developed for use on pickup trucks which do not exceed the dimensions of the cab of the vehicle, and thus do not materially increase its fuel comsumption. However, such camper shells provide very little interior space and are generally unacceptable for family use.

SUMMARY OF THE INVENTION

The present invention provides an improved camper shell which appears similar to those found in the art when the vehicle is in motion. However, a major portion of the roof is hingeable mounted to the trailing end of the forward roof portion along an axis normal to the direction of travel of the vehicle so that the movable portion can be raised at its trailing end when the vehicle is parked. Flexible sheet material connects the sides and trailing edges of the movable portion of the roof to the sides of the shell structure. A ceiling structure spans the side portions of the shell structure immediately beneath the movable portion of the roof when it is lowered, and a bunk is mounted to the upper surface of the ceiling structure beneath the roof.

When the vehicle carrying the camper shell of the present invention is parked, the movable portion of the roof can be raised to provide an extra sleeping area in addition to that already provided by a standard camper shell. The additional space provided by the extra sleeping area allows the entire family to use the camper shell in comfort. The extra sleeping area also allows for the installation of other camping equipment such as stoves, refrigerators and the like in the main portion of the shell. This increase in the usable space in the camper shell is obtained without increasing the frontal area of the structure when the vehicle is in motion beyond the dimensions of the cab. Thus, the camper shell of the present invention does not increase gasoline consumption over camper shells already used, and does not substantially increase gasoline comsumption over that of the vehicle without the camper shell.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 3 is an expanded fragmentary sectional view taken along lines 3—3 of FIG. 1;

FIG. 4 is an expanded fragmentary cross sectional view taken along lines 4—4 of FIG. 1;

FIG. 5 is an expanded fragmentary cross sectional taken along lines 5—5 of FIG. 2;

FIG. 6 is an expanded fragmentary cross sectional view taken along lines 6—6 of FIG. 2.

DESCRIPTION OF THE PREFERRED EMBODIMENT

Figure 1:
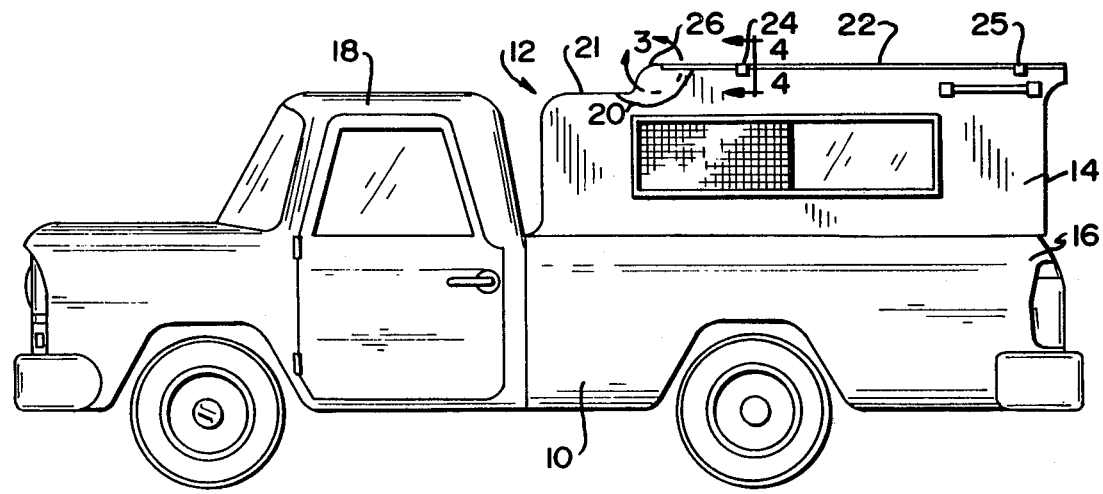
FIG. 1 is a side view of a pickup truck carrying the camper shell of the present invention as the truck is moving.

A pickup truck 10 having the camper shell 12 of the present invention mounted thereto as illustrated in FIG. 1. Camper shell 12 has side portions 14 extending upwardly from the side defining portions 16 of the bed of truck 10. The side portions 14 of shell 12 extend upwardly to approximately the same vertical height of the cab 18 of truck 10. The roof 20 of camper shell 12 has a fixed forward portion 21 and a movable portion 22 which will be illustrated further hereinafter. When pickup truck 10 is in motion, as depicted in FIG. 1, the movable portion 22 of roof 20 is in its lowered position so that it does not extend substantially above the vertical height of cab 18. A pair of clamps 24, 25 retain the movable portion 22 of roof 20 in its lowered position.

As is evident from viewing FIG. 1, camper shell 12 has an exterior configuration substantially similar to known camper shells when truck 10 is in motion, with the possible exception that the trailing end 26 of the fixed forward portion 21 of roof 20 is slightly raised. Thus, mounting camper shell 12 on pickup truck 10 does not substantially increase the frontal area of the vehicle when it is in motion, and its gasoline consumption is not materially increased.

Figure 2:
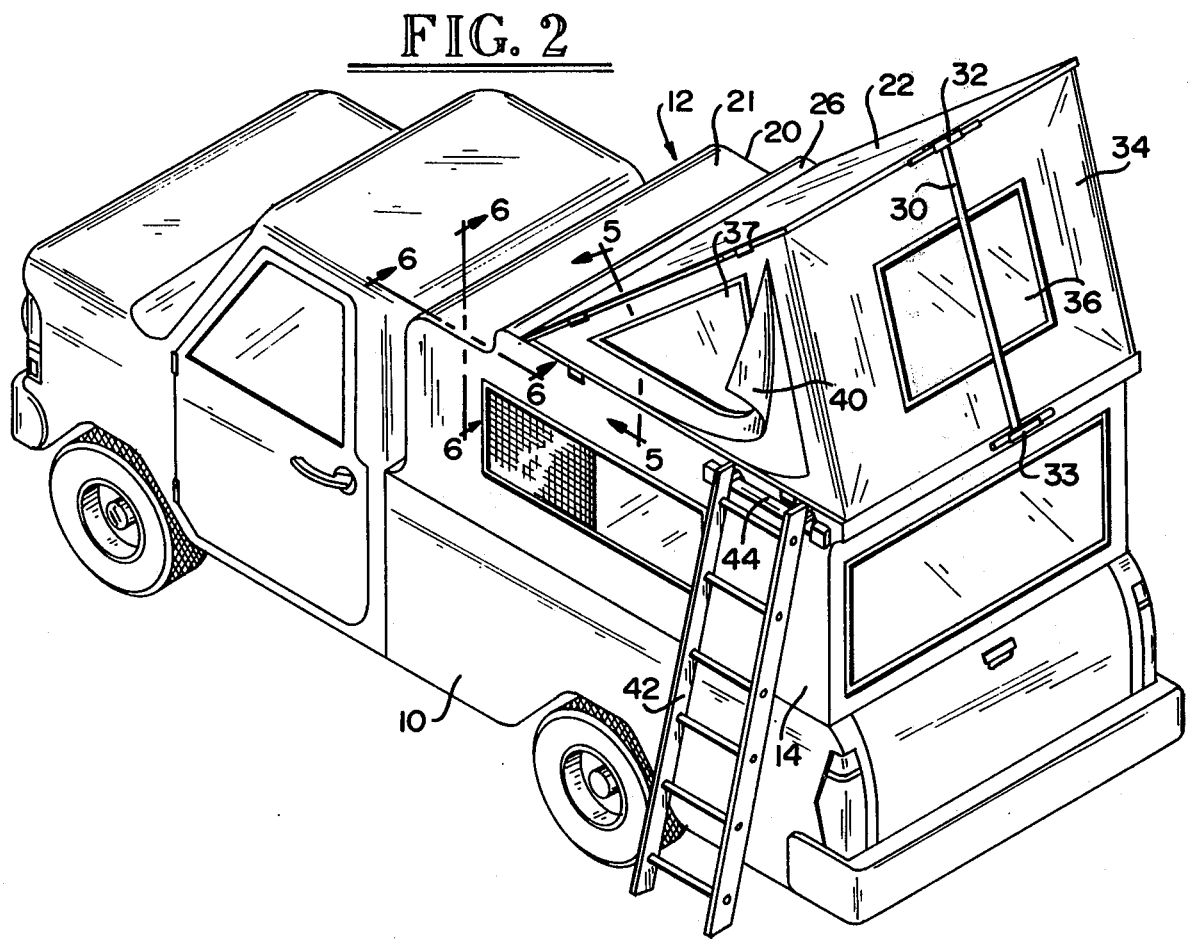
FIG. 2 is a perspective view of the truck and camper shell of FIG. 1 showing the configuration of the camper shell when the truck is parked.

Referring next to FIG. 2, the movable portion 22 of roof 20 is hingeably mounted to the trailing end 26 of fixed forward portion 21 along an axis normal to the direction of travel of truck 10. When pickup truck 10 is parked, as depicted in FIG. 2, the movable portion 22 of roof 20 can be raised at its trailing end. In the embodiment illustrated herein, roof 22 is maintained in its raised position by a pole 30 which fits into opposing brackets 32, 33. Flexible sheet material 34 having a variety of window sections such as 36, 37, connects the sides and trailing edges of the movable portion 22 of the roof to the side portions 14 of the camper shell to enclose the space provided by the raised roof.

Access to the extra space resulting from raising roof portion 22 is provided through a flap 40 in sheet material 34. Flap 40 can be unzipped or otherwise unfastened from the remaining portion of the sheet material to gain entrance to the space beneath raised roof portion 22. A ladder 42 can be mounted on bracket 44 on the side of shell 12 to facilitate entry into this area.

The movable portion 22 of roof 20 is attached to the trailing end of the fixed forward portion 21 by means of hinges 50 interposed therebetween, as shown in FIG. 3. Each hinge 50 comprises a pair of depending rectangular plates 52, 53 from a common pivot 54. A vinyl sheet 56 overlies rectangular plates 52, 53 and spans pivot 54. Plate 52 is fixed to the trailing end of the fixed portion 21 of roof 20 by screws 58 with a portion of vinyl sheet 56 therebetween. Similarly, rectangular plate 53 is fixed to the leading end of the movable portion 22 of roof 20 by screws 60 with another portion of the vinyl sheet 56 therebetween. Thus, vinyl sheet 56 provides a weathertight seal between the fixed and movable portions of roof 20 as the movable portion is raised and lowered.

The clamps, such as 24, which fix the movable portion 22 of the roof to the side portions 14 of the shell are illustrated in more detail by way of reference to FIG. 4. A first clamp member 70 is mounted to the exterior surface of the side portion 14 of the shell by screws 72. First clamp member 70 has an upwardly directed tongue 74 on the upper surface thereof. A second clamp member 76 is attached to the exterior surface of the movable portion 22 of the roof, and has a downwardly directed groove 78 on the underside thereof. When movable portion 22 of the roof is lowered, tongue 74 is adapted to register with groove 78 to fix the horizontal position of the roof.

Second clamp member 76 also has an upwardly directed tongue 80. A clip 82 is pivotably mounted to the underside of first clamp member 70, and has a flange 84 at its free end provided with a groove 86 on the underside thereof. When movable portion 22 of the roof is lowered over the side portions 14 of the shell, and tongue 74 registers with groove 78, the groove 84 in clip 82 can be placed in registry with tongue 80 to rigidly clamp the movable portion 22 of the roof in its lowered position.

The attachment of the flexible sheet material 34 to the movable portion 22 of the roof and the side portions 14 of the camper shell is illustrated in more detail by way of reference to FIG. 5. A first socket 90 having a cross section comprising the major portion of a circle is mounted to the underside of movable portion 22 of the roof adjacent the sides and trailing edges. A rod 92 having the edge of the flexible sheet material wrapped therearound fits within socket 90. This type of connection is customarily called an awning rail. A similar awning rail including a socket 94 and rod 96 is mounted on the inner surface of the side portion 14 of the shell structure. In this manner, sound weathertight seals are formed between the flexible sheet material 34 and both the movable portion 22 of the roof and side portion 14 of the shell. When the movable portion 22 of the roof is lowered, sheet material 34 will merely fold inside and will not interfere with the lowering of the roof.

The interior construction of camper shell 12 is illustrated in more detail by way of reference to FIG. 6. A plurality of studs 100 span the width of the camper shell from one side to the other. A ceiling facade 102 is mounted to the lower surfaces of studs 100, and a floor board 104 is mounted to the upper surface of the studs. Studs 100, ceiling facade 102 and floor board 104 all constitute a ceiling structure for the lower volume 106 of camper shell 12.

A bunk frame 108 is mounted on the upper surface of floor board 104, and a mattress 110 can be placed in the frame to provide a bunk. The trailing end 26 of the fixed forward portion 21 of roof 20 is slightly raised as illustrated so that the movable portion 22 of the roof overlies mattress 110 when the movable portion of the roof is in its lowered position. However, when the movable portion 22 of the roof is raised, the additional space provided thereby will allow sleeping on mattress 110, thus giving the camper shell an extra sleeping area.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What I claim as new is:

1. A camper shell adapted to be mounted on the bed of a pickup truck or similar vehicle, said camper shell comprising:
    a shell structure adapted to be mounted to the bed of the vehicle, said shell structure including side portions extending upwardly from the side-defining portions of said bed to a vertical height approximately equal to the height of the cab of the vehicle, and a roof including a forward portion fixed to the side portions of the shell structure and a movable portion hingeably mounted to the trailing end of the forward portion along an axis normal to the direction of travel of the vehicle so that said movable portion can be raised at its trailing end to add to the interior space of the shell structure when the vehicle is parked and lowered to streamline the shell structure when the vehicle is moving;
    flexible means connecting the sides and trailing edges of the movable portion of the roof to the side portions of the shell structure for enclosing the interior of the shell structure when the movable portion of the roof is raised;
    a ceiling structure spanning the side portions of the shell structure adjacent the upper ends of said side portions;
    a bunk mounted to the upper surface of the ceiling structure beneath the movable portion of the roof;
    means for clamping the movable portion of the roof in the lowered position when the vehicle is moving; and
    means for maintaining the movable portion of the roof in the raised position when the vehicle is parked.

2. A camper shell as recited in claim 1 and additionally comprising a hinge adapted to hingeably mount the movable portion of the roof to the trailing end of the forward portion of the roof, said hinge including first and second rectangular plates hingeably fixed together along one edge so that the first and second plates depend between the forward and movable portions of the roof, and a vinyl sheet overlying the first and second plates and spanning the hingeably fixed edges, said first plate being joined to the forward portion of the roof with a portion of the overlying vinyl sheet intermediate therebetween and said second plate being joined to the movable portion of the roof with another portion of the overlying vinyl sheet intermediate therebetween to provide a weathertight seal between the forward and movable portions of the roof.

3. A camper shell as recited in claim 1 wherein said flexible means includes flexible sheet material, and awning rails joining the flexible sheet material to the underside of the sides and trailing edges of the movable portion of the roof and to the inner surfaces of the side portions of the shell structure to provide a weathertight seal between the sheet material and the shell structure.

4. A camper shell as recited in claim 1 wherein said clamping means includes a first clamp member attached to the exterior surface of the side portion of the shell structure and having an upwardly directed tongue, a second clamp member attached to the exterior surface of the movable portion of the roof and having a groove on the under side thereof adapted to mate with the tongue on the first clamp member when the movable portion of the roof is lowered, said second clamp member further having an upwardly directed tongue and a clip connected to the first clamp member and having a free end adapted to overlie the tongue on the second clamp member to clamp the movable portion of the roof to the side portion of the shell structure.

5. A camper shell adapted to be mounted on the bed of a pickup truck or similar vehicle, said camper shell comprising:
- a shell structure adapted to be mounted to the bed of the vehicle, said shell structure including side portions extending upwardly from the side-defining portions of said bed to a vertical height approximately equal to the height of the cab of the vahicle, and a roof spanning the side portions of the shell structure, said roof including a forward portion fixed to the side portions of the shell and having a slightly raised trailing end and a movable portion hingeably mounted to the raised trailing end of the forward portion along an axis normal to the direction of travel of the vehicle so that said movable portion can be raised and lowered;
- a ceiling structure spanning the side portions of the vehicle immediately beneath the forward portion of the roof and providing a space between the upper surface of the ceiling structure and the movable portion of the roof;
- a bunk mounted to the upper surface of the ceiling structure and occupying the space between said upper surface and the movable portion of the roof when the roof is in its lowered position;
- means for clamping the movable portion of the roof in its lowered position when the vehicle is moving;
- means for maintaining the movable portion of the roof in the raised position when the vehicle is parked; and
- flexible sheet material connecting the sides and trailing edges of the movable portion of the roof to the side portions of the shell structure to provide an enclosed sleeping area when the movable portion of the roof is raised.

6. A camper shell adapted to be mounted on the bed of a pickup truck or similar vehicle, said camper shell comprising:
- a shell structure adapted to be mounted to the bed of the vehicle, said shell structure including side portions extending upwardly from the side-defining portions of said bed to a vertical height approximately equal to the height of the cab of the vehicle, and a roof including a forward portion fixed to the side portions of the shell structure and a moveable portion adapted to be hingeably mounted to the trailing end of the forward portion along an axis normal to the direction of travel of the vehicle so that said movable portion can be raised at its trailing end to add to the interior space of the shell structure when the vehicle is parked and lowered to streamline the shell structure when the vehicle is moving;
- at least one hinge adapted to hingeably mount the movable portion of the roof to the trailing end of the forward portion of the roof, said hinges each including first and second rectangular plates hingeably fixed together along one edge so that the first and second plates depend between the forward and movable portions of the roof, and a vinyl sheet overlying the first and second plates and spanning the hingeably fixed edges, said first plate of each hinge being joined to the forward portion of the roof with a portion of the overlying vinyl sheet intermediate therebetween and said second plate being joined to the movable portion of the roof with another portion of the overlying vinyl sheet intermediate therebetween to provide a weathertight seal between the forward and movable portions of the roof;
- flexible means connecting the sides and trailing edges of the movable portion of the roof to the side portions of the shell structure for enclosing the interior of the shell structure when the movable portion of the roof is raised;
- a ceiling structure spanning the side portions of the shell structure adjacent the upper ends of said side portions;
- a bunk mounted to the upper surface of the ceiling structure beneath the movable portion of the roof;
- means for clamping the movable portion of the roof in the lowered position when the vehicle is moving; and
- means for maintaining the movable portion of the roof in the raised position when the vehicle is parked.

* * * * *